US012543794B1

(12) United States Patent
Perez

(10) Patent No.: US 12,543,794 B1
(45) Date of Patent: Feb. 10, 2026

(54) VAPING DEVICE WITH INTEGRATED SMOKE NEUTRALIZATION

(71) Applicant: MC HOLDINGS US LLC, Huntington Beach, CA (US)

(72) Inventor: Chris Perez, Seal Beach, CA (US)

(73) Assignee: MC HOLDINGS US LLC, Huntington Beach, CA (US)

( * ) Notice: Subject to any disclaimer, the term of this patent is extended or adjusted under 35 U.S.C. 154(b) by 0 days.

(21) Appl. No.: 19/196,116

(22) Filed: May 1, 2025

Related U.S. Application Data

(63) Continuation of application No. 18/929,040, filed on Oct. 28, 2024.

(51) Int. Cl.

| | |
|---|---|
| ***A24F 40/485*** | (2020.01) |
| ***A24F 7/04*** | (2006.01) |
| ***A24F 40/10*** | (2020.01) |
| ***A24F 40/42*** | (2020.01) |
| ***A24F 40/60*** | (2020.01) |
| ***B01D 53/02*** | (2006.01) |

(52) U.S. Cl.
CPC .............. *A24F 40/485* (2020.01); *A24F 7/04* (2013.01); *A24F 40/10* (2020.01); *A24F 40/42* (2020.01); *A24F 40/60* (2020.01); *B01D 53/02* (2013.01); *B01D 2253/102* (2013.01); *B01D 2259/4541* (2013.01)

(58) Field of Classification Search
None
See application file for complete search history.

(56) References Cited

U.S. PATENT DOCUMENTS 4,790,332 A * 12/1988 Wallace .................. A24F 13/18 131/330
2016/0058959 A1* 3/2016 Hearn .................. A61M 15/06 128/200.14
2018/0116276 A1* 5/2018 Prog ..................... A24F 13/06
2019/0037923 A1* 2/2019 Shenkal ................ A24F 40/485
2024/0049799 A1* 2/2024 Yang ..................... A24F 47/00

FOREIGN PATENT DOCUMENTS

WO WO-2023065166 A1 * 4/2023 ............. A24F 40/48

* cited by examiner

*Primary Examiner* — Michael H. Wilson
*Assistant Examiner* — Tobey C Le
(74) *Attorney, Agent, or Firm* — DANE IP Law PC

(57) ABSTRACT

The described vaping device is an all-in-one system that allows users to inhale vaporized liquid and exhale smoke, which is filtered through activated carbon granules. The device utilizes dual-purpose apertures for both inhalation and exhalation. A small airhole regulates airflow during inhalation, preventing the backflow of exhaled air into the inhalation mouthpiece. The device also features ergonomically distinct mouthpieces for inhalation and exhalation, providing tactile feedback to ensure the user correctly identifies which mouthpiece is in use. Additionally, the design requires users to change the device's position during inhalation and exhalation, further preventing confusion between the two functions.

5 Claims, 8 Drawing Sheets

VAPING DEVICE WITH INTEGRATED SMOKE NEUTRALIZATION

CROSS REFERENCE TO RELATED APPLICATIONS

This application is a continuation of U.S. application Ser. No. 18/929,040, filed on 2024 Oct. 28, the contents of which are expressly incorporated by reference herein.

STATEMENT RE: FEDERALLY SPONSORED RESEARCH/DEVELOPMENT

Not Applicable.

BACKGROUND

The various aspects and embodiments described herein relate to vaping devices.

One of the major challenges with current vaping devices is their unsuitability for use in enclosed areas. Many public and private spaces restrict vaping due to concerns over lingering vapor, odors, and secondhand exposure. While vaping does not produce traditional smoke, the exhaled vapor can still be disruptive, especially in confined environments like offices, restaurants, or vehicles. This limitation forces users to step outside or find designated areas, reducing the convenience and appeal of vaping.

Accordingly, there is a need in the art for an improved vaping device.

BRIEF SUMMARY

The vaping device described is an all-in-one system allowing users to inhale vaporized liquid and exhale smoke, which is then filtered through activated carbon granules. A dual-purpose apertures is used for both inhalation and exhalation. A small airhole used during inhalation prevents exhaled air from back flowing into the inhalation mouthpiece. Additionally, the device incorporates ergonomic mouthpieces for inhalation and exhalation, each designed to provide distinct tactile feedback so that the user knows if they are using the inhalation or exhalation mouthpiece. Moreover, the user is required to change positions during inhalation and exhalation to prevent any confusion as to whether the user is inhaling or exhaling.

A vaping device may include an inhalation mouthpiece configured to enable a user to inhale vaporized liquid and an exhalation mouthpiece configured to enable the user to exhale and neutralize smoke. The device may include a housing that encloses a reservoir for storing a vaporizable liquid and a vaporizer for converting the liquid into vapor. A dual-purpose aperture located at the bottom of the housing may be fluidly connected to both the inhalation and exhalation mouthpieces. Air may flow from the dual-purpose aperture through an airhole to the inhalation mouthpiece when the user inhales. Air may flow from the exhalation mouthpiece through a pouch containing activated carbon to the dual-purpose aperture when the user exhales. The airhole may have a smaller size than the dual-purpose aperture to prevent backflow of exhaled smoke into the inhalation mouthpiece.

In another aspect, a vaping device may include an airhole with a cross-sectional area that may be smaller than the cross-sectional area of the dual-purpose aperture, allowing for controlled airflow.

In another aspect, a vaping device may include an airhole with a diameter of 0.5 mm, and the dual-purpose aperture may have a cross-sectional area that is 25 times the size of the airhole to ensure proper airflow separation.

In another aspect, a vaping device may include activated carbon granules placed in a flowpath between the exhalation mouthpiece and the dual-purpose aperture to neutralize smoke as it flows through the device.

A vaping device may include an inhalation mouthpiece and an exhalation mouthpiece, where each mouthpiece may have different ergonomic shapes. The device may include a housing that contains a reservoir for storing vaporizable liquid and a vaporizer for generating vapor. A pouch containing activated carbon may be positioned to neutralize exhaled smoke. Airflow may move from the exhalation mouthpiece through the activated carbon granules and out of a dual-purpose aperture. The ergonomic shapes of the mouthpieces may help prevent the user from inhaling through the exhalation mouthpiece or exhaling through the inhalation mouthpiece.

In another aspect, a vaping device may include an airhole in the inhalation mouthpiece that limits airflow when the user inhales. If the user attempts to exhale through the airhole, back pressure may build up, training the user to use the correct mouthpiece for inhaling and exhaling.

In another aspect, a vaping device may include an inhalation mouthpiece with an oval shape and an exhalation mouthpiece with a curved recess to provide ergonomic comfort and correct usage.

In another aspect, a vaping device may include an airhole in the inhalation mouthpiece with a diameter of 0.5 mm to restrict airflow during inhalation.

In another aspect, a vaping device may include an exhalation mouthpiece that provides tactile feedback to the user due to its curved shape, helping the user correctly identify the exhalation mouthpiece by feel.

In another aspect, a vaping device may include an inhalation mouthpiece with a first airflow direction that may be angled differently from a second airflow direction of the exhalation mouthpiece.

In another aspect, a vaping device may include a first airflow direction and a second airflow direction where the angles between the two directions may be between 20 and 70 degrees.

In another aspect, a vaping device may include an inhalation mouthpiece where the airflow direction is parallel to the exterior surface of the mouthpiece, and the exhalation airflow direction may be determined by the normal direction of a tangent line at the midpoint of the curved recess of the exhalation mouthpiece.

A vaping device may include an inhalation mouthpiece for inhaling vaporized liquid and an exhalation mouthpiece for exhaling smoke. A dual-purpose aperture at the bottom of the housing may be fluidly connected to both the inhalation and exhalation mouthpieces. When the user inhales, air may flow from the dual-purpose aperture through an airhole to the inhalation mouthpiece. When the user exhales, air may flow from the exhalation mouthpiece through a pouch containing activated carbon to the dual-purpose aperture. The airhole may prevent the backflow of exhaled smoke into the inhalation mouthpiece due to its smaller size.

In another aspect, a vaping device may include a plurality of dual-purpose apertures with a cumulative cross-sectional area that is sufficiently larger than the airhole to prevent the backflow of exhaled smoke through the airhole and out of the inhalation mouthpiece.

A method of using a vaping device may include aligning an inhalation mouthpiece with the user's lips and inhaling vaporized liquid while holding the device in an upright position, defining a first airflow direction. After inhaling, the user may tilt the device until an exhalation mouthpiece is aligned with the lips, defining a second airflow direction that may differ from the first. The user may exhale smoke through the exhalation mouthpiece while it is aligned with the lips.

In another aspect of the method of using a vaping device, the step of exhaling smoke may include preventing exhaled smoke from proceeding through an airhole in the inhalation mouthpiece to prevent backflow of smoke.

In another aspect, a method of using a vaping device is disclosed. The vaping device may comprise an inhalation mouthpiece and an exhalation mouthpiece. The method may comprise aligning an inhalation mouthpiece to lips of a user; pressing the lips of the inhalation mouthpiece against the lips of the user; inhaling vaporized liquid through the inhalation mouthpiece while holding the device in an upright orientation and a first position, the upright orientation defined by the inhalation mouthpiece being at a higher elevation compared to an airflow aperture which draws air into the vaping device, air flow being directed upward during inhalation; after the inhaling step, tilting the device at an angle to a second position while the vaping device is in the upright orientation with a wrist of the user until an exhalation mouthpiece is aligned to the lips of the user; and exhaling smoke through the exhalation mouthpiece while holding the device in the upright orientation and the second position and while the exhalation mouthpiece is aligned to the lips of the user, airflow being directed downward during exhalation; wherein shapes of the inhalation mouthpiece and exhalation mouthpiece are different to provide tactile feedback to guide the user to correctly position the device for inhalation and exhalation.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
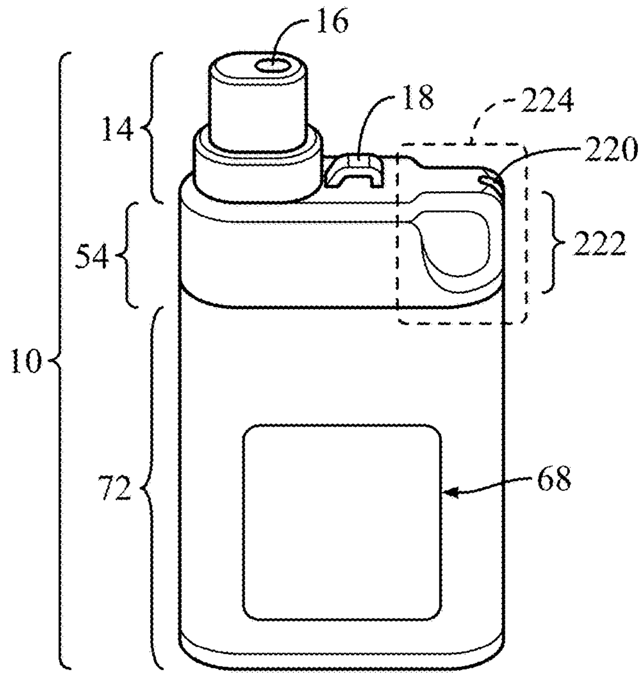
FIG. 1 is an external top perspective view of a vaping device, showing the inhalation mouthpiece, exhalation mouthpiece, and digital screen.
Figure 2:
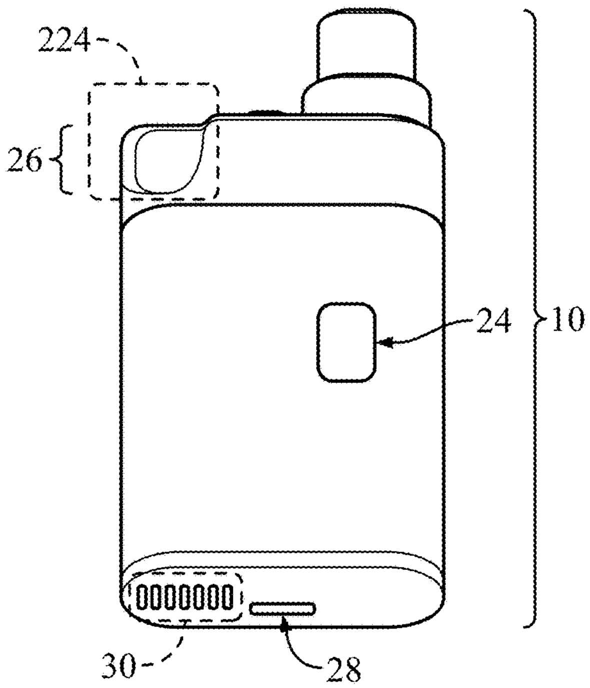
FIG. 2 is an external bottom perspective view of the device's housing, highlighting the USB port, control button, and airflow apertures.
Figure 7:
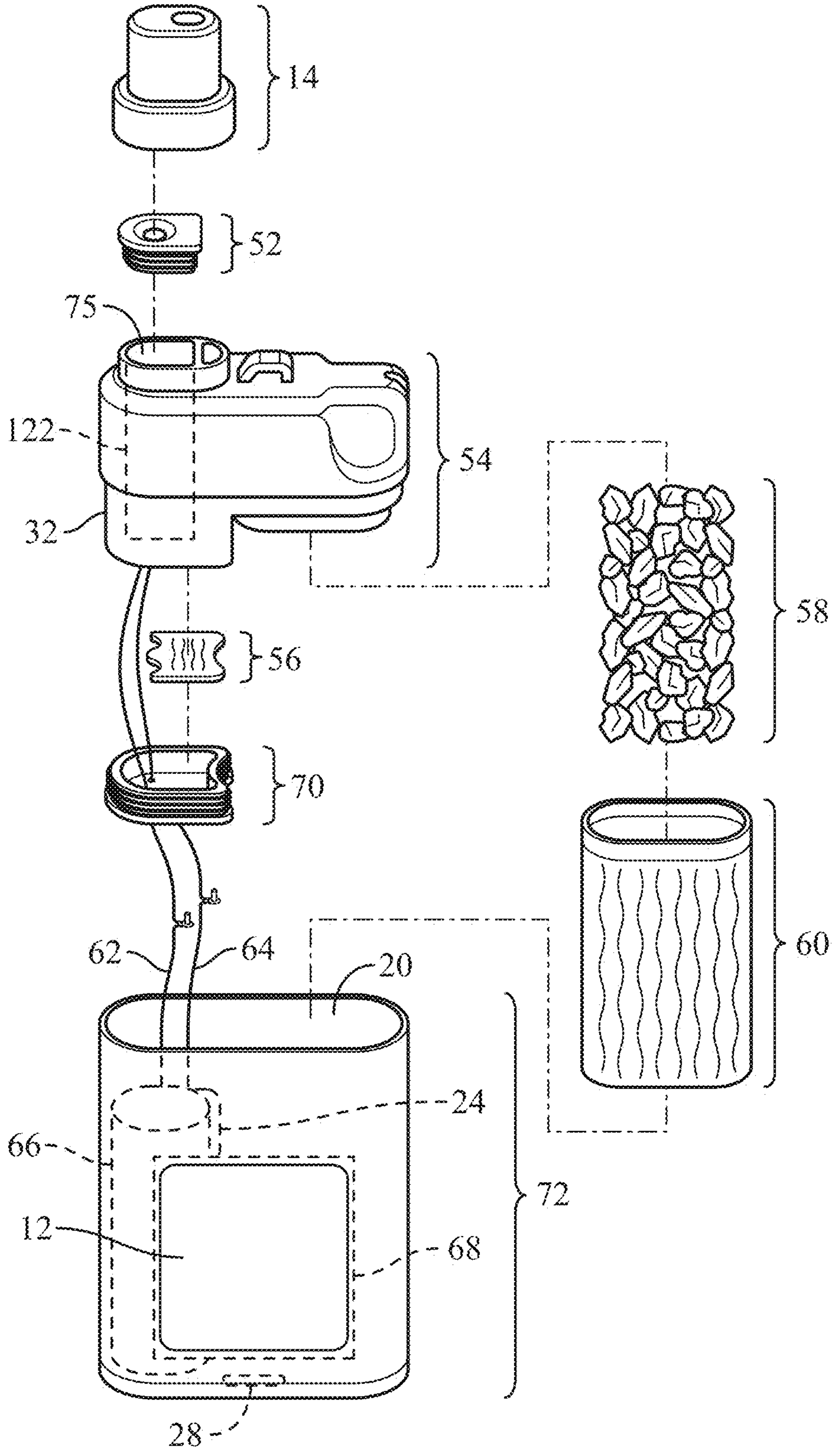
FIG. 7 is an exploded top perspective view of the device.

The vaping device 10, as shown in FIGS. 1, 2, and 7, includes several unique features that enhance its functionality and user experience. It features an inhalation mouthpiece 14, configured for vaporized liquid intake, and an exhalation mouthpiece 224, designed to neutralize exhaled smoke using activated carbon granules 58. The housing 72, as depicted in FIGS. 1, 2, 5, and 7, encloses components such as the vaporizer 114 and the reservoir 122, which stores the vaporizable liquid. A feature is a dual-purpose aperture 30, located at the bottom of the housing and shown in FIGS. 2 and 5. This aperture 30 serves both the inhalation and exhalation mouthpieces, allowing air to flow from the dual-purpose aperture 30 (see FIG. 2) to the inhalation mouthpiece during inhalation, while preventing backflow of exhaled smoke due to the size differential between the airhole 74 and the dual-purpose aperture 30. Exhaled air flows through the exhalation mouthpiece 224, through a pouch 60 containing activated carbon granules 58, and exits via the dual-purpose aperture 30. The ergonomic designs of the inhalation mouthpiece 14 and the exhalation mouthpiece 224, shown in FIGS. 1 and 7, provide tactile feedback to guide the user, ensuring they distinguish between the two mouthpieces and preventing inadvertent misuse where the use might exhale into the inhalation mouthpiece or inhale using the exhalation mouthpiece. If the user attempts to exhale into the inhalation mouthpiece then the airflow is severely restricted through the airhole 74. The user would know immediately that the user is blowing out through the inhalation mouthpiece. The user would also have to tilt the device to comfortably inhale via the inhalation mouthpiece versus exhale smoke through the exhalation mouthpiece.

The vaping device 10 (shown in FIGS. 1, 2, and 7) may be an all-in-one system that allows a user to inhale vaporized liquid and exhale smoke, which may then be neutralized through the use of activated carbon granules 58. The device may be designed for ease of use, ergonomic comfort, and efficient vaporization and filtration. The device may include the following primary components: a housing 72, top cover 54 which incorporates an exhalation mouthpiece 224, inhalation mouthpiece 14, battery 66, vaporizer 114, reservoir 122, and a series of apertures and channels to facilitate airflow during both inhalation and exhalation.

The housing 72 (shown in FIGS. 1, 2, 5, and 7) may serve as the external body of the device and may enclose its critical internal components, including the battery 66, PCB board, reservoir 122, and vaporizer 114. The housing 72 may be made from durable, heat-resistant materials such as plastic or aluminum, designed to protect the internal components from damage and heat while providing a lightweight, easy-to-handle structure for the user.

The upper opening 20 (shown in FIG. 7) of the housing 72 may be designed to receive the top cover 54, which may seal in the internal components. The top cover 54 may be secured in place by a flange 32 (shown in FIG. 7) using methods such as friction fit, sonic welding, or adhesive bonding. The flange 32 may snugly fit within the upper opening 20 then attached thereto as discussed herein.

Located at the bottom of the housing 72 are the dual-purpose apertures 30 (shown in FIGS. 2 and 5), which may serve dual functions: These apertures allow fresh air to enter the device during inhalation and enable filtered air to exit during exhalation. These dual-purpose apertures 30 may be part of the airflow management system that ensures proper separation of inhaled air and exhaled neutralized smoke.

Figure 9:
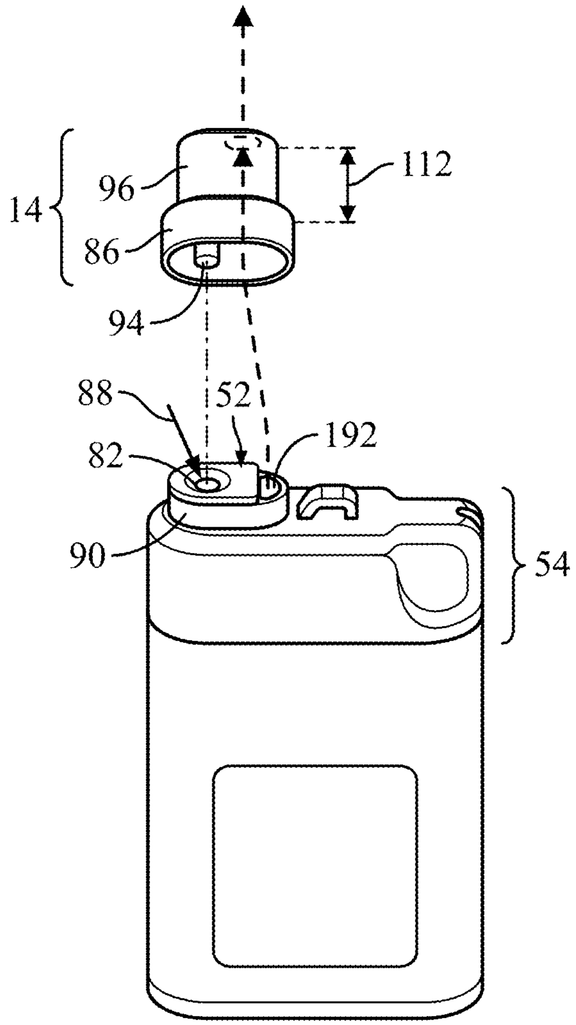
FIG. 9 shows the fill hole for filling a reservoir and a reservoir plug in the top cover for sealing the fill hole.

To prevent the mixing of inhaled vapor and exhaled smoke, the dual-purpose apertures 30 and airhole 74 (shown in FIG. 9 and discussed in detail herein) may work together to control airflow. The airhole 74 may have a preferred diameter of 0.5 mm. The diameter of the airhole 74 may range from 0.3 mm to 1.0 mm depending on the design, ensuring controlled airflow during inhalation while preventing backflow of exhaled smoke through the inhalation mouthpiece because the airhole 74 is sufficiently small so that the exhaled air would be routed to the dual purpose apertures 30 and not follow the inhalation flowpath 48 (shown in FIG. 5) back to the inhalation mouthpiece. The dual-purpose apertures 30 may have a cross-sectional area approximately 25 to 100 times larger than the airhole 74, ensuring air does not flow through the airhole 74 due to air exhaled into the exhalation mouthpiece. Rather, the exhaled air would prefer to be flow out of the dual purpose apertures 30. The size difference between the airhole 74 and the dual purpose apertures 30 may create a pressure differential that prevents exhaled air from flowing backward into the inhalation mouthpiece 14 through the airhole 74.

The vaping device 10 may include a permeable filter pad 56 located adjacent to the vaporizer 114. This filter pad 56 may filter the vaporized liquid before it is inhaled, contributing to the overall filtration system of the device and ensuring a cleaner inhalation experience.

The top cover 54 (shown in FIGS. 7, 8, and 9) may be a key structural component that covers the upper opening 20 of the housing 72. The top cover 54 may hold the internal components, including the reservoir 122 and vaporizer 114. The top cover 54 may be attached to the housing 72 using the flange 32 (shown in FIG. 7). The upper side of the top cover 54 may be connected to the reservoir plug 52, which seals the aperture 75. The bail 18 (shown in FIG. 1) may be attached to the top cover 54 and may serve as a way to carry the device 10 with a strap or chain.

The top cover 54 may include a protruding wall 90 (see FIG. 9), which fits securely into the peripheral wall 86 of the inhalation mouthpiece. This protruding wall 90 may ensure a tight connection between the top cover and inhalation mouthpiece.

Figure 10:
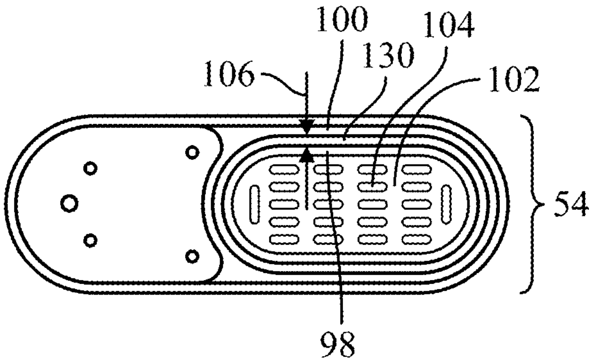
FIG. 10 illustrates a bottom view of a top cover of the device.

The top cover 54 may also define a groove 130 (shown in FIG. 10) into which the upper peripheral portion of the permeable pouch 60 is inserted. The groove 130 ensures that the pouch 60 remains securely in place during operation due to a friction fit between the pouch 60 and the groove 130. The upper periphery of the permeable pouch 60, which contains the activated carbon granules 58, may be pushed into the groove 130 of the top cover 54, forming a secure fit that prevents movement or dislodgment of the pouch during exhalation. This arrangement may help ensure that all exhaled air passes through the activated carbon granules 58 for proper filtration before exiting the device through the dual-purpose apertures 30.

The groove 130, into which the permeable pouch 60 is inserted, may be defined by an inner wall 98 and an outer wall 100. These walls may serve to guide the pouch during insertion and provide structural stability, ensuring the pouch remains securely in place. The distance 106 between the inner wall 98 and outer wall 100 of the groove 130 may be configured to accommodate the thickness 108 of the permeable pouch 60. This ensures the pouch fits tightly within the groove, allowing for effective filtration of exhaled air. A plate 102 may be positioned in the top cover 54. This plate 102 may include apertures 104 that allow filtered air to pass through during exhalation.

Figure 11:
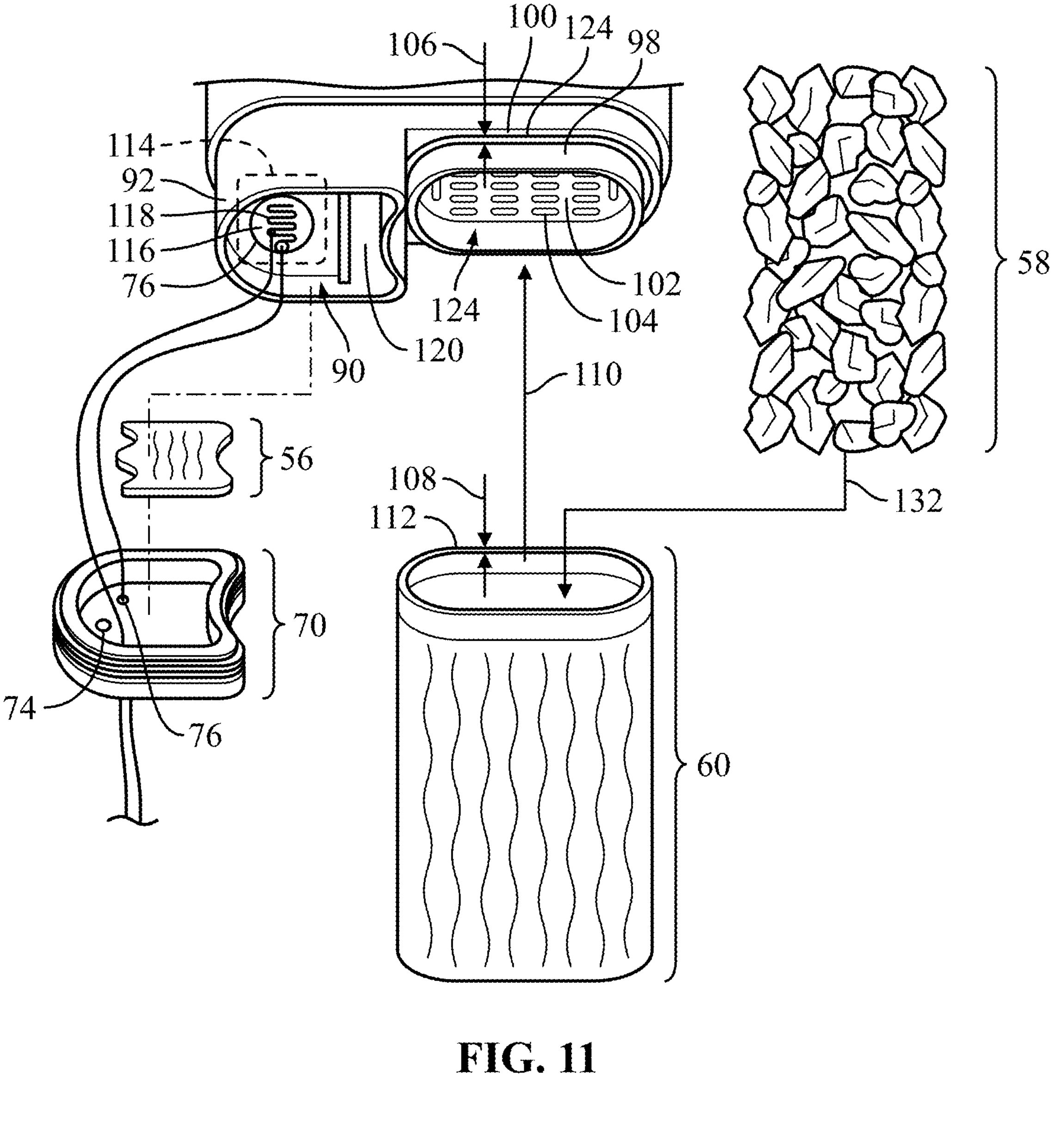
FIG. 11 is an exploded view showing the vaporizer.

To assemble the device, the permeable pouch 60 containing the activated carbon granules 58 may be provided. Enough activated granules 58 are inserted into the pouch so that the activated carbon granules fills the entire pouch, as shown by arrow 132 in FIG. 11. The upper periphery of the pouch 60 may be aligned with the groove 130 in the top cover 54. The pouch 60 may be gently pressed into the groove 130, ensuring a secure and tight fit, as shown by arrow 110 in FIG. 11. An adhesive may be optionally be used to further secure the pouch to the groove 130. This assembly step ensures that the pouch 60 remains in position, allowing all exhaled air to pass through the activated carbon granules 58 during exhalation.

Once the pouch 60 is securely inserted into the groove 130, the top cover 54 may be attached to the housing 72. The top cover 54 is positioned over the upper opening 20 of the housing 72, and the flange 32 of the top cover engages with the corresponding surface of the housing. The top cover may be secured using friction fit, adhesive bonding, or sonic welding to ensure a stable connection between the components.

The other parts of the device 10 such as the reservoir 122 and vaporizer 114, may be a part of the top cover. A reservoir plug 52 is inserted into the aperture 75. It may be seal with the ribs 80 to prevent liquid leakage from the reservoir 122. The inhalation mouthpiece 14 may be attached to their respective positions to complete the assembly. When the inhalation mouthpiece 14 is attached to the top cover 54, a plug 94 is inserted into the fill hole 82 and seals the hole to prevent escape of eliquid from the reservoir. The exhalation mouthpiece may be fabricated to be integral with the top cover.

The electronic digital screen 68 (shown in FIGS. 1 and 7) may be located within a screen aperture on the side of the housing 72. This screen may display essential information, including the battery life, remaining vape hits, and the selected flavor of the e-liquid. The electronic digital screen 68 may be powered by the battery 66 and may be activated when the user presses the button 24 (shown in FIGS. 1 and 2) once. This feature ensures that the user can monitor the device's status during use.

The button 24 (shown in FIGS. 1, 2, and 7) may be the main control mechanism for the device. Pressing the button 24 once may activate the electronic digital screen 68, displaying critical information. Pressing the button twice may activate the vaporizer 114, initiating the vaporization process wherein the heater is activated and vaporizes the eliquid absorbed into the absorbent pad 116. After pressing the button twice, the user can inhale the vaporized eliquid. The button 24 may be electronically connected to the PCB board, which manages the device's electrical systems, including the flow of power from the battery 66 to the heating element 118 (shown in FIG. 8) within the vaporizer 114.

Wires 62 and 64 may connect the vaporizer 114 and the battery 66 to the PCB board. These wires may enable the electrical communication required to power the vaporizer and activate the heating element 118, facilitating the vaporization process.

The device may be equipped with an electronic digital screen 68 that displays essential information for the user. By pressing the button 24 once, the user may activate the screen to view various statistics, including the remaining battery life, the number of available vape hits, and the selected e-liquid flavor. This allows the user to monitor the device's status without activating the vaporizer 114. The screen may remain active for a brief period after the button is pressed, providing enough time for the user to check the device's condition before automatically turning off to conserve battery power.

The USB port 28 (shown in FIGS. 2, 7, and 8) may be located at the bottom of the housing 72 and may serve as a charging interface for the battery 66. The USB port 28 may also be used for programming the PCB board, allowing for firmware updates or device customization. The battery 66 may be rechargeable and may provide sufficient power to the vaporizer 114 and the electronic digital screen 68. Depending on the design, the battery 66 may be large enough to vaporize all the liquid in the reservoir 122, or it may be smaller and require periodic recharging. Using a smaller rechargeable battery would lower manufacturing costs.

The inhalation mouthpiece 14 (shown in FIGS. 1, 7, and 9) may be designed for comfort and efficiency, ensuring that vapor may be smoothly inhaled by the user. The aperture 16 (shown in FIG. 1) may allow the vapor to pass through into the user's mouth. The vapor is generated by the vaporizer 114 (see FIG. 11), which may be connected to the inhalation mouthpiece 14 via the inhalation flowpath 48 (shown in FIG. 5). The lip engaging surface 96 (shown in FIGS. 9 and 7) may be oval-shaped to improve comfort and help the user intuitively identify the inhalation mouthpiece 14.

The lip engaging surface 96 of the inhalation mouthpiece 14 may have a defined height 112, designed to improve comfort and create an airtight seal during use. This ensures the user experiences efficient vapor inhalation. An aperture 192 may be located in the top cover 54 to allow for the inhalation flowpath 48 to pass through. This aperture may guide the airflow from the dual-purpose apertures 30 to the inhalation mouthpiece 14, ensuring proper delivery of vapor to the user.

The airflow direction for the inhalation mouthpiece may be indicated by the inhalation arrow 34 (shown in FIGS. 3 and 5), ensuring that the vapor may be drawn correctly through the device. The inhalation mouthpiece 14 may create an airtight seal with the user's lips to allow efficient inhalation.

The direction of airflow through the inhalation mouthpiece 14 may be defined by the outer surface 96 of the mouthpiece 14. The airflow may be designed to follow a path that is aligned with the shape and contour of the external surface of the mouthpiece, as indicated by the inhalation arrow 34 (shown in FIG. 3 and FIG. 5). The ergonomic shape of the outer surface may help guide the airflow into the inhalation flowpath 48, making it intuitive for the user to ensure that they aren't confused as to whether they are using the exhalation mouthpiece.

The exhalation mouthpiece 224 (shown in FIGS. 1, 2, 7, and 9) may allow the user to exhale smoke after vaporization. The aperture 220 (shown in FIG. 1) may direct the exhaled smoke into the exhalation flowpath 50 (shown in FIG. 5). The mouthpiece may feature a front recess 222 and a rear recess 26 (shown in FIGS. 1 and 7) that are ergonomically shaped to ensure that the user knows that they are using the exhalation mouthpiece and not the inhalation mouthpiece.

Figure 3:
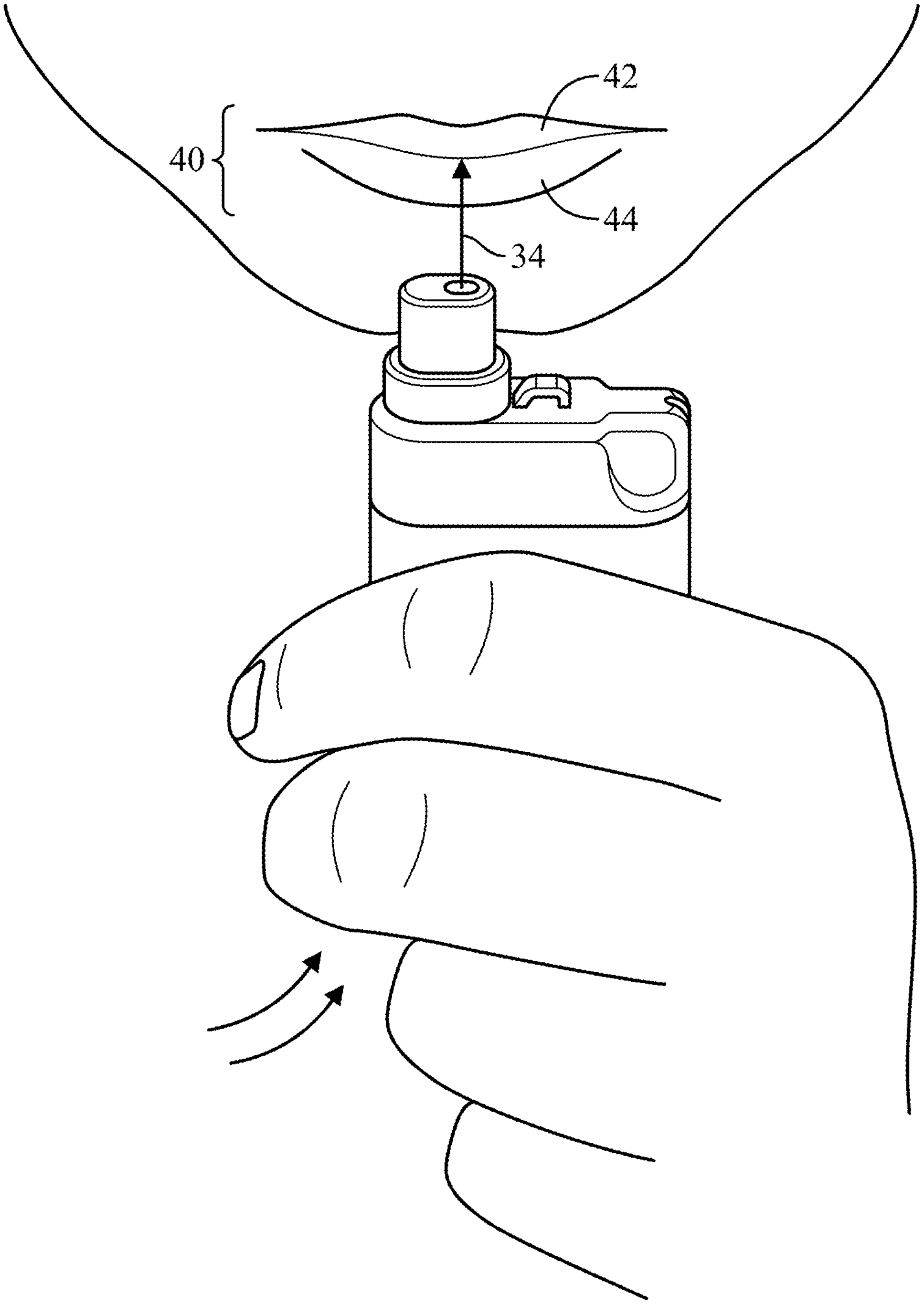
FIG. 3 shows a detailed view of a direction of airflow through the inhalation mouthpiece.
Figure 4:
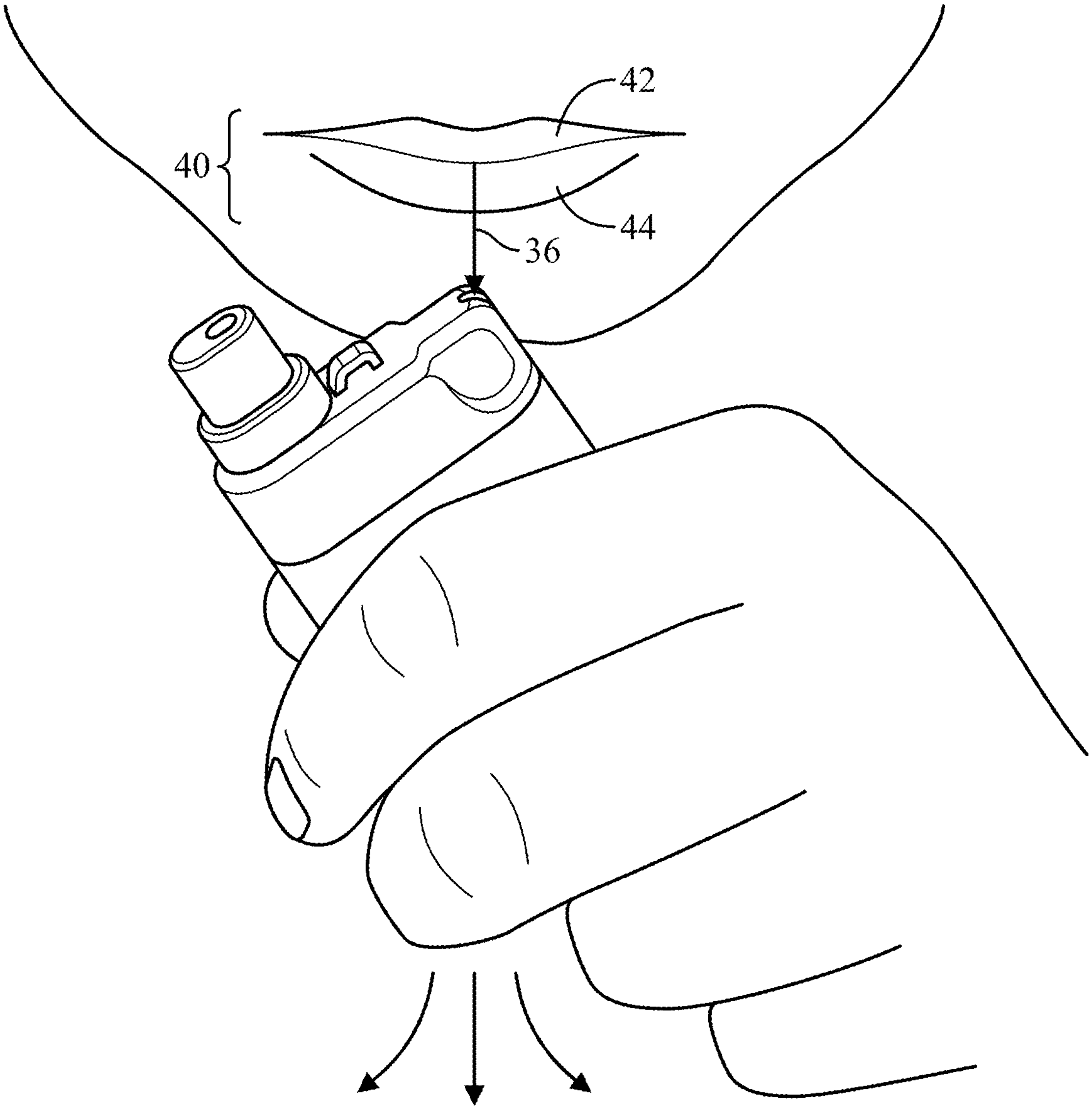
FIG. 4 illustrates an airflow direction through the exhalation mouthpiece.
Figure 5:
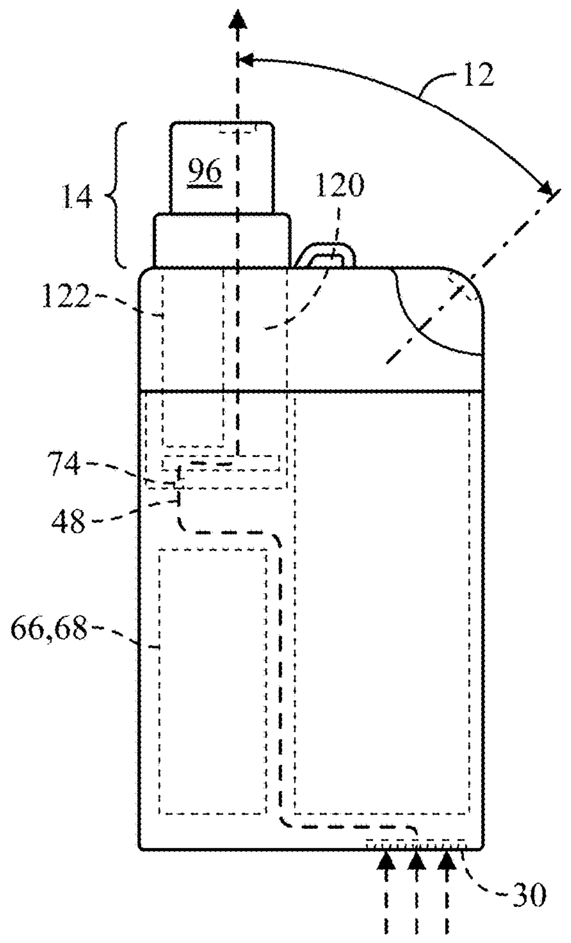
FIG. 5 displays an internal airflow pathway for inhalation and a direction of airflow being upright during inhalation.
Figure 6:
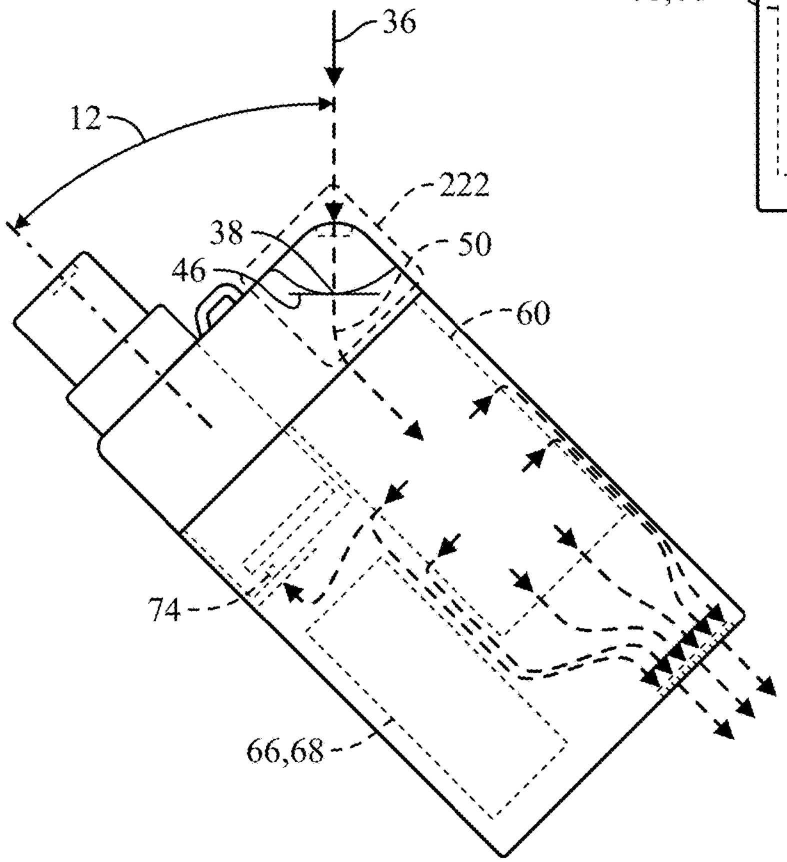
FIG. 6 displays an internal airflow pathway for exhalation and a tilt angle of a direction of the airflow upon exhalation with respect to the direction of airflow during inhalation.

The airflow direction through the exhalation mouthpiece 224 may be determined by the normal direction of a tangent line 46 at the midpoint 38 of the curved recess 222, as shown by the exhalation arrow 36 (shown in FIGS. 3, 4 and 6). This ensures that the exhaled air may be directed correctly into the exhalation mouthpiece and not into the inhalation mouthpiece so as to be filtered by the activated carbon granules 58 (shown in FIG. 7). Additionally, the ergonomic shape of the exhalation mouthpiece 224 may provide tactile feedback, helping the user distinguish it from the inhalation mouthpiece 14 and guiding them to use the correct mouthpiece for exhalation.

The curved recess 222 of the exhalation mouthpiece 224 (shown in FIGS. 1 and 7) may play a critical role in defining the direction of the exhalation airflow. The airflow direction may be guided by the geometric structure of the recess, specifically the normal direction of a tangent line 46 at the midpoint 38 of the curved recess 222.

The exhalation mouthpiece 224 may also include a lower aperture 124, which may help guide exhaled air through the exhalation flowpath 50. This aperture 124 may assist in maintaining smooth airflow and effective filtration during exhalation.

This design may ensure that exhaled smoke is channeled correctly through the activated carbon granules 58 for proper filtration before exiting the device. The curved recess 222 not only provides an ergonomic fit for the user's lips but may also ensure that user knows that the user is exhaling smoke into the exhalation mouthpiece and not the inhalation mouthpiece. The curvature may effectively align the airflow with the exhalation arrow 36 (shown in FIG. 4), further emphasizing the role of the recess in guiding the smoke toward the filtration system.

The dual-purpose apertures 30 (shown in FIGS. 2 and 5) may be located at the base of the housing 72. These apertures 30 may allow air to enter the device during inhalation and enable filtered air to exit the device during exhalation. The dual-purpose apertures 30 may be connected to both the inhalation flowpath 48 and the exhalation flowpath 50, ensuring separate airflow in both directions. The size difference between the airhole 74 (shown in FIG. 9) and the dual-purpose apertures 30 may be critical for maintaining separation of the airflow paths, which prevents exhaled smoke from re-entering the inhalation side.

The plug 70 (shown in FIG. 9) may be positioned within the top cover 54 to ensure that all inhaled air is directed exclusively through the airhole 74. The plug 70 may form a seal in the lower portion of the top cover 54, effectively blocking any alternative airflow paths and forcing all inhaled air to pass through the airhole 74. This controlled airflow design ensures that the user can only inhale air that flows through the airhole 74. The airhole 74 may be small in diameter (typically 0.5 mm, as described) so that exhaled air and the pressure generated within the housing isn't sufficient to push exhaled air through the airhole 74. Due to the very large dual purpose apertures 30, the exhaled air would flow through the very large dual purpose apertures instead of the airhole 74. The plug 70 isolates the airflow and prevents exhaled air forced through the exhalation mouthpiece from flowing to the inhalation mouthpiece 14.

The housing 72 may define a cavity 84, which encloses the internal components such as the reservoir 122 and vaporizer 114. Surrounding the cavity 84 may be a peripheral wall that provides structural support and protects the device's internal components from damage.

The reservoir 122 (shown in FIGS. 5 and 7) may store the vaporizable liquid, which may include nicotine-based or CBD e-liquids. The reservoir plug 52 (shown in FIG. 9) seals the aperture 75 (shown in FIG. 7), preventing any leakage. The plug 52 includes ribs 80 (shown in FIG. 8) that slide against the inner surface of the aperture 75 to create a tight seal. The user may fill the reservoir 122 by injecting or pouring eliquid into the fill hole 82 using a syringe or other device.

The reservoir 122 may include a lower opening 76, allowing the vaporizable liquid to flow into the vaporizer 114. This lower opening 76 may be designed to regulate the flow of liquid to prevent leakage while ensuring efficient vaporization.

Figure 8:
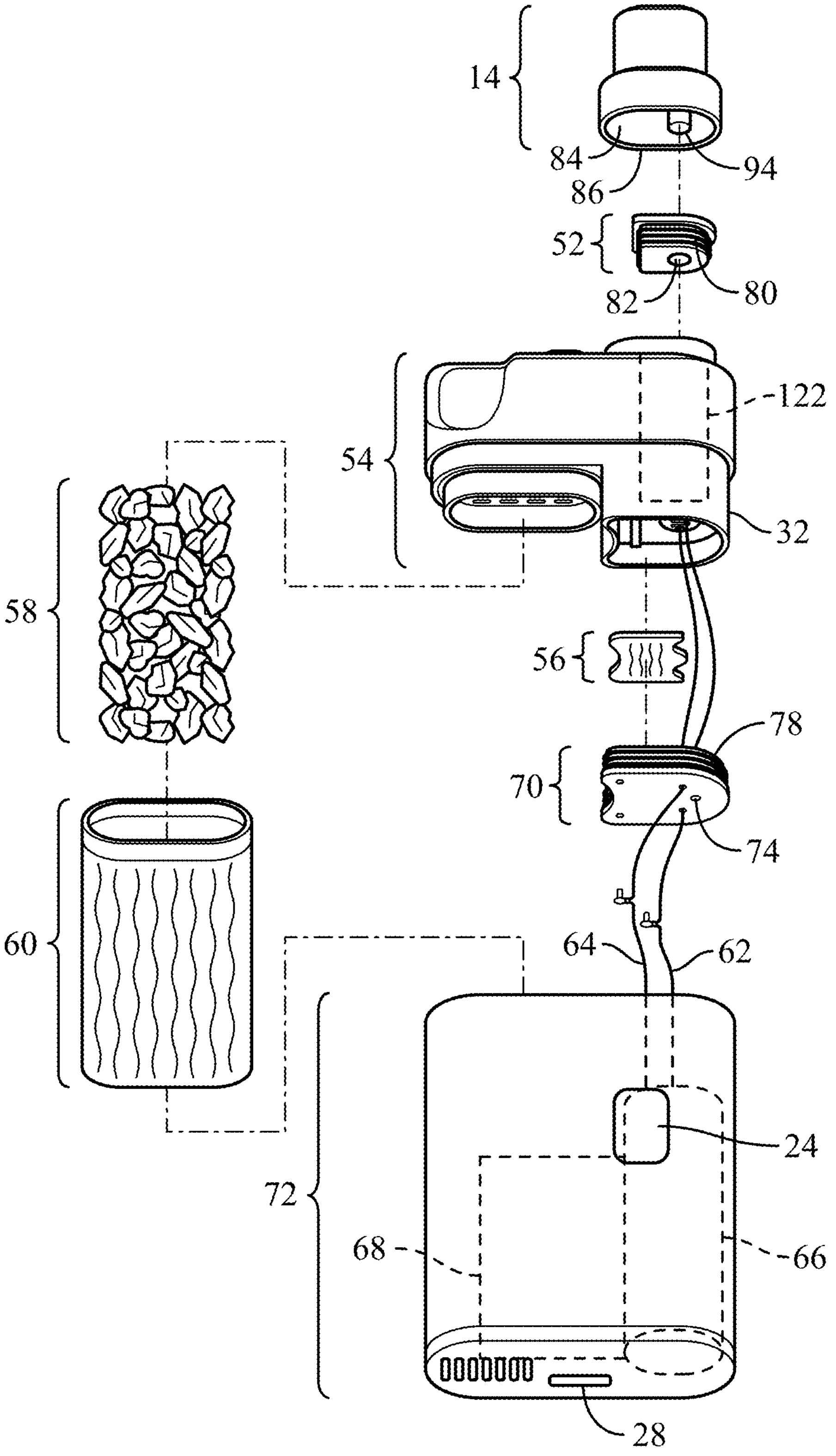
FIG. 8 is an exploded bottom perspective view of the device.

To fill the device with e-liquid, the user first removes the plug 94 located in the fill hole 82 (shown in FIG. 8). Once the fill hole 82 is exposed, the user may insert the nozzle of an e-liquid syringe or dropper into the fill hole 82 and gradually fill the reservoir 122 with the desired amount of e-liquid. Care should be taken not to overfill the reservoir 122 to avoid spillage. The reservoir 122 may be designed to hold a sufficient volume of liquid to allow extended vaping sessions.

A pour arrow 88 may be located near the fill hole 82, serving as a guide for the user during the refilling process. The arrow 88 may ensure that the e-liquid is directed properly into the fill hole, minimizing the risk of spills during refilling.

After the reservoir has been filled, the user may push the plug 94 of the inhalation mouthpiece back into the fill hole 82 to seal it.

The device may be designed to be compatible with CBD liquid, allowing the user to vaporize and inhale the benefits of CBD through the inhalation mouthpiece 14. However, the reservoir 122 may also be used with other types of e-liquids, including nicotine-based liquids or flavored e-liquids. The vaporizer system, including the vaporizer 114 and heating element 118, may be engineered to handle various e-liquid viscosities and compositions, ensuring efficient vaporization regardless of the liquid type.

The vaporizer 114 (shown in FIGS. 7 and 8) may be responsible for converting the liquid in the reservoir 122 into vapor. It may include an absorbent pad 116 (shown in FIG. 11), which may draw the liquid from the reservoir 122, and a heating element 118 (shown in FIG. 11) that vaporizes the liquid. The vapor may then be directed through the channel 120 (shown in FIGS. 5 and 11) and into the inhalation mouthpiece 14. The PCB board (not shown) may regulate the power to the heating element 118 to vaporize the eliquid.

The exhalation flowpath 50 (shown in FIG. 6) may lead to a permeable pouch 60 (shown in FIG. 7) that contains activated carbon granules 58. These granules may neutralize harmful particles in the exhaled smoke. As the user exhales, the smoke may travel through the permeable pouch 60 and be filtered by the activated carbon granules 58 before exiting the device through the dual-purpose apertures 30. The size and granulation of the activated carbon granules 58 may be optimized to ensure that the exhaled smoke by the user exits out of the dual purpose apertures 30 as clear and effectively filtering smoke.

The amount of activated carbon granules 58 within the permeable pouch 60 may be specifically calculated to neutralize all the smoke generated by a full volume of e-liquid stored in the reservoir 122. The quantity of activated carbon may be optimized to ensure it absorbs all harmful particles and odors produced during exhalation so that the entire reservoir of e-liquid can be smoked or vaporized. This may ensure that clean, filtered air is expelled through the device via the dual-purpose apertures 30, maintaining filtration efficiency throughout the full use of the e-liquid.

The battery 66 in the device may be sized large enough to vaporize the entire volume of e-liquid in the reservoir 122 without needing to recharge, ensuring the user can fully use the device in one charge cycle. However, if the battery 66 is sized smaller to reduce manufacturing costs or device size, the user may need to recharge it more frequently. In such cases, the battery 66 may require recharging partway through the use of the e-liquid in the reservoir. The frequency of recharging may depend on the battery's capacity and the power consumption of the vaporizer 114. For instance, a smaller battery 66 might need to be recharged after vaporizing half of the liquid in the reservoir 122. The user may recharge the battery 66 as necessary to complete the vaporization of all the liquid. This design provides flexibility in balancing device size, cost, and user convenience.

The method of use for the device may include several steps to ensure optimal performance. The method may include an inhalation step, exhalation step and an optional recharging step.

During inhalation, the user holds the device upright, placing their lips around the inhalation mouthpiece 14. After pressing the button 24 twice, the vaporizer 114 may be activated, vaporizing the liquid absorbed into the absorbent pad. As the user inhales, fresh air may enter the device through the dual-purpose apertures 30 and travel along the inhalation flowpath 48, through the airhole 74 to the inhalation mouthpiece 14, delivering vapor to the user.

During exhalation and after inhaling, the user tilts the device to approximately 45 degrees (see FIG. 6) and exhales through the exhalation mouthpiece 224. The exhaled smoke may follow the exhalation arrow 36, enter the exhalation flowpath 50, and be filtered by the activated carbon granules 58 before exiting the device through the dual-purpose apertures 30. Filtered air forced out of the pouch 60 pressurizes the inside of the housing. The pressure will try to force exhaled air into the airhole 74 and back into the inhalation mouthpiece. However, the airhole 74 is very small compared to the dual purpose apertures 30 so that the exhaled air would find an easier path to flow due to the pressure out of the dual purpose apertures 30.

During use, the user may have to recharge the battery. In this regard, the the electronic digital screen 68 may indicate when the battery 66 is low. The user may recharge the device by connecting a charger to the USB port 28. The battery 66 powers the vaporizer 114 and the electronic digital screen 68, ensuring that the device is ready for future use.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of using a vaping device, the vaping device comprising an inhalation mouthpiece and an exhalation mouthpiece, the method comprising:

aligning an inhalation mouthpiece to lips of a user;

pressing the lips of the inhalation mouthpiece against the lips of the user;

inhaling vaporized liquid through the inhalation mouthpiece while holding the device in an upright orientation and a first position, the upright orientation defined by the inhalation mouthpiece being at a higher elevation compared to an airflow aperture which draws air into the vaping device, air flow being directed upward during inhalation;

after the inhaling step, tilting the device at an angle to a second position while the vaping device is in the upright orientation with a wrist of the user until an exhalation mouthpiece is aligned to the lips of the user;

exhaling smoke through the exhalation mouthpiece while holding the device in the upright orientation and the second position and while the exhalation mouthpiece is aligned to the lips of the user, airflow being directed downward during exhalation;

wherein shapes of the inhalation mouthpiece and exhalation mouthpiece are different to provide tactile feedback to guide the user to correctly position the device for inhalation and exhalation.

2. The method of claim 1 further comprising a step of feeling a first ergonomic shape of the inhalation mouthpiece then performing the inhaling step.

3. The method of claim 2 further comprising a step of feeling a second ergonomic shape of the exhalation mouthpiece which is different from the first ergonomic shape then performing the exhaling step.

4. The method of claim 2 wherein the inhalation mouthpiece has an oval shape.

5. The method of claim 4 wherein the exhalation mouthpiece has a curved recess.

* * * * *